United States Patent
Miura

(10) Patent No.: US 7,472,945 B2
(45) Date of Patent: Jan. 6, 2009

(54) OVERHEAD GUARD OF INDUSTRIAL VEHICLE

(75) Inventor: Tomomichi Miura, Kariya (JP)

(73) Assignee: Kabushiki Kaisha Toyota Jidoshokki, Kariya-Shi (JP)

( * ) Notice: Subject to any disclaimer, the term of this patent is extended or adjusted under 35 U.S.C. 154(b) by 0 days.

(21) Appl. No.: 11/396,207

(22) Filed: Mar. 30, 2006

(65) Prior Publication Data

US 2006/0220419 A1 Oct. 5, 2006

(30) Foreign Application Priority Data

Mar. 31, 2005 (JP) .............................. 2005-103796

(51) Int. Cl.
*B62D 25/07* (2006.01)
(52) U.S. Cl. .................. 296/190.03; 296/213; 296/210
(58) Field of Classification Search ................ 296/210, 296/213, 190.03, 190.01, 190.08, 193.06, 296/193.12, 107.05, 135, 208, 102; 280/756
See application file for complete search history.

(56) References Cited

U.S. PATENT DOCUMENTS

| | | | | |
|---|---|---|---|---|
| 4,332,415 A | * | 6/1982 | Williams | 296/213 |
| 4,582,358 A | * | 4/1986 | Draper | 296/213 |
| 4,600,236 A | * | 7/1986 | Weiss et al. | 296/190.03 |
| 5,009,464 A | * | 4/1991 | Hasegawa et al. | 296/213 |
| 6,186,584 B1 | * | 2/2001 | Samuelson et al. | 296/213 |
| 6,409,254 B2 | * | 6/2002 | Tiziano | 296/190.08 |
| 6,464,291 B2 | * | 10/2002 | Hynds et al. | 296/213 |
| 6,485,084 B2 | * | 11/2002 | Sorensen et al. | 296/102 |
| 6,702,370 B2 | * | 3/2004 | Shugar et al. | 296/211 |
| 6,769,732 B2 | * | 8/2004 | Sakyo | 296/190.03 |
| 2006/0192412 A1 | * | 8/2006 | Schonauer et al. | 296/213 |

FOREIGN PATENT DOCUMENTS

| | | |
|---|---|---|
| EP | 1 394 019 A1 | 3/2004 |
| JP | 11-011347 | 1/1999 |
| JP | 2001-171992 | 6/2001 |
| JP | 2002-145118 | 5/2002 |

OTHER PUBLICATIONS

European Search Report dated Jul. 13, 2007 issued by European Patent Office for application No. 06111925.1-1268.

* cited by examiner

*Primary Examiner*—Glenn Dayoan
*Assistant Examiner*—Greg Blankenship
(74) *Attorney, Agent, or Firm*—Morgan & Finnegan, LLP

(57) ABSTRACT

An overhead guard of an industrial vehicle has a top and a plurality of pillars. The top is disposed above and covers an operator's seat. The top includes a dam body and a slope portion. The dam body is formed at its front edge and/or rear edge by bending upward a part of the top. The slope portion slopes down toward the dam body. The pillars support the top. At least one of the pillars has a groove extending in a longitudinal direction of the pillar so as to be obliquely upward or upright. Water on the top is guided by the dam body to drain onto the groove.

7 Claims, 7 Drawing Sheets

FRONT ← → REAR

FRONT ← → REAR

OVERHEAD GUARD OF INDUSTRIAL VEHICLE

TECHNICAL FIELD

The present invention relates to an overhead guard of an industrial vehicle and more particularly to an overhead guard that helps water on the top of the overhead guard of the vehicle to drain off.

A forklift truck, which is a material handling vehicle, is often equipped with an overhead guard for protecting an operator against objects falling from the above. Most of the overhead guards of forklift trucks include a plurality of pillars disposed upright around the operator's seat and a plate-like top supported by the pillars.

An example of a conventional overhead guard is shown in FIG. 6. The drawing shows only the relevant parts of the overhead guard 60 which include a plurality of pillars, a top 66 and a dam 69. The pillars include a pair of front pillars 61 (only one front pillar 61 being shown in FIG. 6) and a pair of rear pillars (not shown). Each front pillar 61 includes a pillar portion 62 and a top support 64 which is connected to the rear pillar. The pillar portion 62 and the top support 64 have grooves 63 and 65 formed therein extending in the longitudinal direction of the vehicle. The top 66 is mounted substantially horizontally on the top supports 64.

The top 66 has a plurality of holes 67 formed therethrough for visibility. A transparent resin cap 68 is fitted in each hole 67. The dam 69 provided in the form of a long plate-like member is mounted along the front edge of the top 66. The dam 69 is fixed in a tilted position to the top 66 by bolts 70 and extends to the pillar portions 62 at the opposite ends thereof, as shown in FIGS. 6 and 7. It is noted that the dam 69 projects downward from the front edge of the top 66 and, therefore, a transparent resin is used for the dam 69 for the sake of visibility from the operator's seat.

When a forklift truck is operated outside in the rain, rainwater will inevitably be gathered on the top 66. For example, upon braking of the forklift truck while moving, the dam 69 dams or holds back the water on the top 66 thereby to prevent the water from falling onto the operator's seat from the front edge of the top 66. In addition, the dam 69 guides the dammed water toward the opposite sides, or toward the pillar portions 62. Furthermore, the groove 63 of the pillar portion 62 has a function to drain the guided water. According to this prior art, the dam 69 prevents the water gathered on the top 66 from falling onto the operator's seat or guides the water toward the pillar portions 62 and then drains along the pillars 62 depending on the running condition of the forklift truck. This prior art is disclosed in the unexamined Japanese patent application publication No. 2001-171992.

In this prior art, however, attachment of the dam to the top requires an attaching means, such as bolt and welding, as well as the attaching work. Therefore, it is unavoidable that the number of components for the overhead guard becomes greater and attaching work is required, with the result that it is difficult to shorten the time for manufacturing of the overhead guard. Moreover, the top according to the prior art is made of a substantially flat plate-like member and supported by pillars in a substantially horizontal position, so that it has such a structure that water tends to be gathered on the top without being promptly drained therefrom. Furthermore, when the transparent resin dam is used for visibility, it is necessary for the forklift truck operator to see through the dam, so that the visibility is lower in comparison to a vehicle having no dam.

The present invention is directed to providing an overhead guard of an industrial vehicle which helps water gathered on the top to drain off and also achieves the reduced number of components of a forklift truck and shortened manufacturing time.

SUMMARY

In accordance with the present invention, an overhead guard of an industrial vehicle has a top and a plurality of pillars. The top is disposed above and covers an operator's seat. The top includes a dam body and a slope portion. The dam body is formed at its front edge and/or rear edge by bending upward a part of the top. The slope portion slopes down toward the dam body. The pillars support the top. At least one of the pillars has a groove extending in a longitudinal direction of the pillar so as to be obliquely upward or upright. Water on the top is guided by the dam body to drain onto the groove.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention together with objects and advantages thereof, may best be understood by reference to the following description of the presently preferred embodiments together with the accompanying drawings in which:

DETAILED DESCRIPTION OF THE PREFERRED EMBODIMENTS

Figure 1:
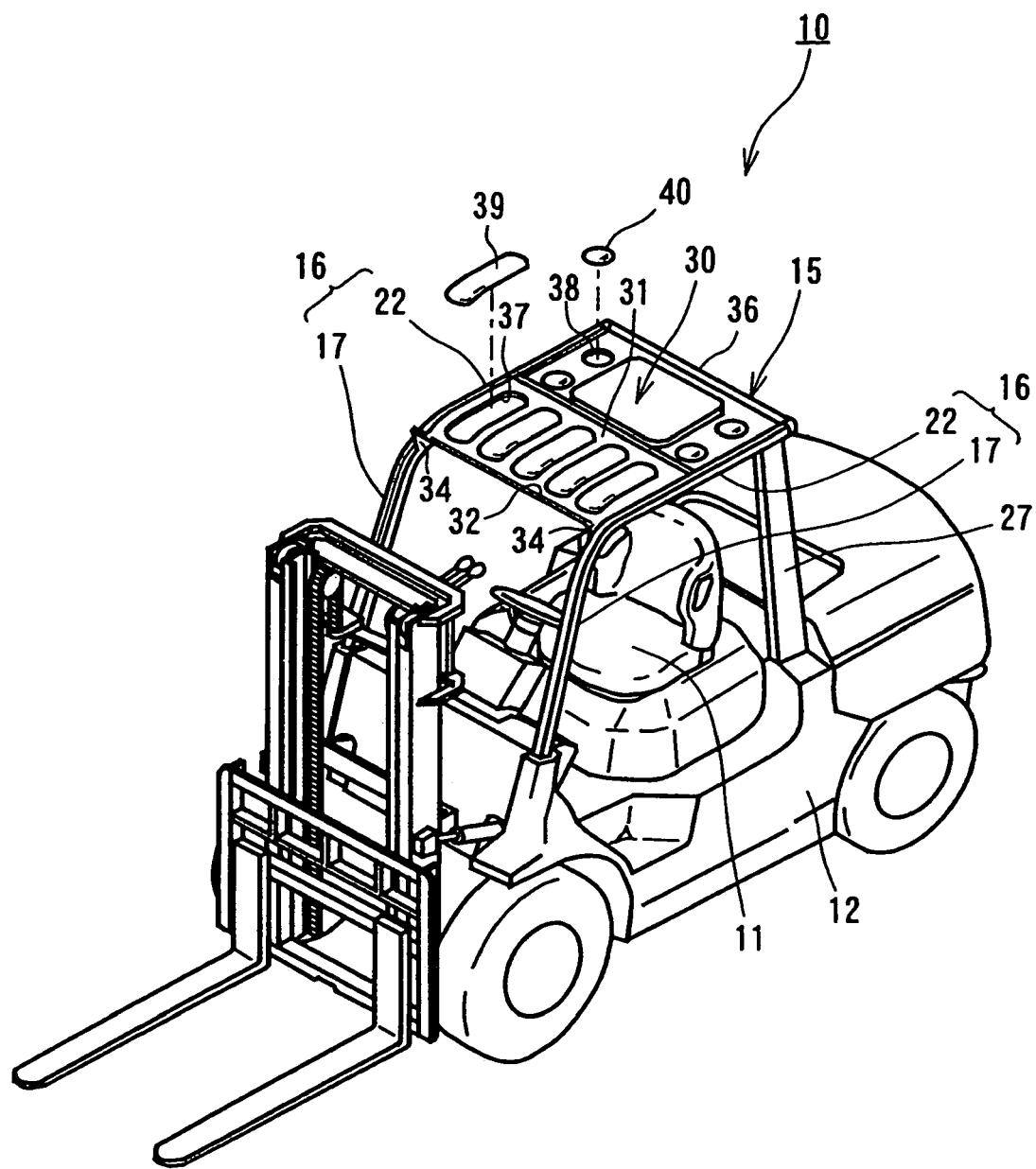
FIG. 1 is a perspective view of a forklift truck having an overhead guard according to a first preferred embodiment of the present invention.

The following will describe a first preferred embodiment of an overhead guard 15 of an industrial vehicle according to the present invention with reference to FIGS. 1 through 4. The first preferred embodiment shows an example of application of an overhead guard to a forklift truck. FIG. 1 is a perspective view showing a forklift truck 10 equipped with the overhead guard 15 for protecting an operator on operator's seat 11. The overhead guard 15 includes a plurality of pillars and a top 30 supported by the pillars.

The pillars will now be described. Referring to FIG. 1, the pillars in this embodiment include a pair of front pillars 16 which are provided on the opposite sides of a vehicle body 12 adjacent to the front side of the operator's seat 11 and a pair of rear pillars 27 (only one rear pillar 27 being shown in FIG. 1) provided on the opposite sides of the vehicle body 12 adjacent to the rear side of the operator's seat 22. Each front pillar 16 includes a pillar portion 17 inclined rearward and a top support 22 extending rearward from the top end of the pillar portion 17.

Figure 4:
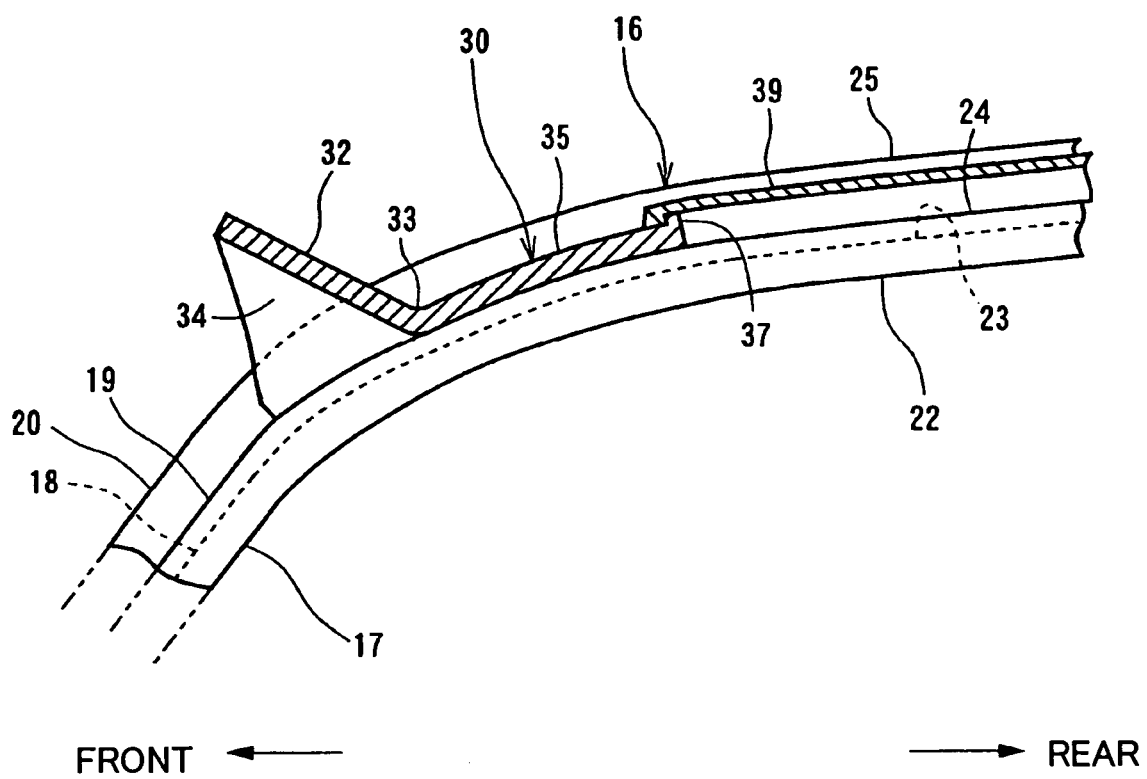
FIG. 4 is a schematically longitudinal cross-sectional view of a top of the overhead guard according to the first preferred embodiment of the present invention.

The top support 22 is gradually inclined rearwardly upward, as most clearly shown in FIG. 4. The front pillar 16 has generally a substantially dogleg shape, and the top 30 is supported by the top support 22. Each rear pillar 27 is disposed upright and welded at the top thereof to the top support 22 adjacent to its rear end. In the first preferred embodiment, the front pillars 16 and the rear pillars 27 are fixedly welded to the vehicle body 12.

The front and rear pillars 16, 27 are made of hollow members which are prepared by roll forging a pipe having a uniform thickness. The hollow member formed by roll forging is cut into predetermined lengths. Then, the hollow member for the front pillar 16 is bent for forming the pillar portion 17 and the top support 22. Each front pillar 16 has grooves 18, 23 formed therein and extending in the longitudinal direction of the pillar portion 17 and the top support 22, respectively. These grooves 18, 23 of the front pillars 16 serve to guide water and, therefore, they extend obliquely upward or upright as seen from the front of the vehicle to permit the water to flow downward by its own weight.

Figure 3A:
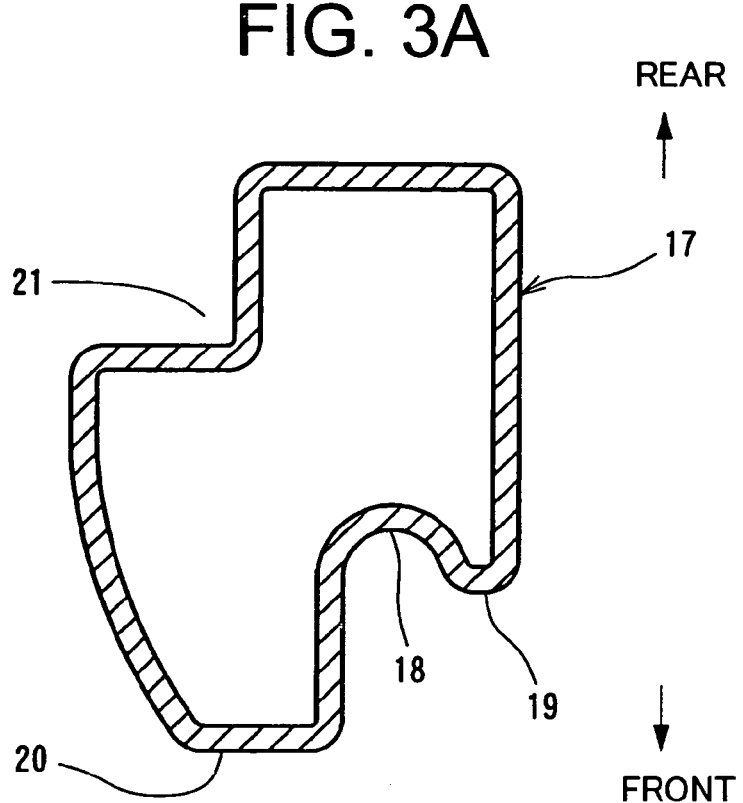
FIG. 3A is a cross-sectional view of a pillar of the overhead guard, taken along the line I-I in FIG. 2.

Referring to FIG. 3A, the groove 18 of the pillar portion 17 is defined by inner and outer projections 19 and 20 both projecting frontward. The inner projection 19 is located on the inner side of the pillar portion 17 and the outer projection 20 is located on the outer side of the pillar portion 17. As shown clearly in FIG. 3A, the inner projection 19 projects forward less than the outer projection 20. Similarly, referring to FIG. 3B, the groove 23 of the top support 22 is defined by an inner projection 24 and an outer projection 25. Each groove 18, 23 has a circular arc shape in cross-section. The grooves 18, 23 are not limited to the illustrated shape, but it may be of V-shaped, U-shaped or any other cross-section.

Recesses 21, 26 are formed along the pillar portion 17 and the top support 22, respectively, at the outer lower portion of the front pillar 16. The recesses 21, 26 are formed so that the corner of the front pillar 16 is recessed or dented so as to reduce the area of the front pillar 16 that blocks the operator's sight as seen from the operator's seat 11 thereby to widen the operator's view.

Figure 2:
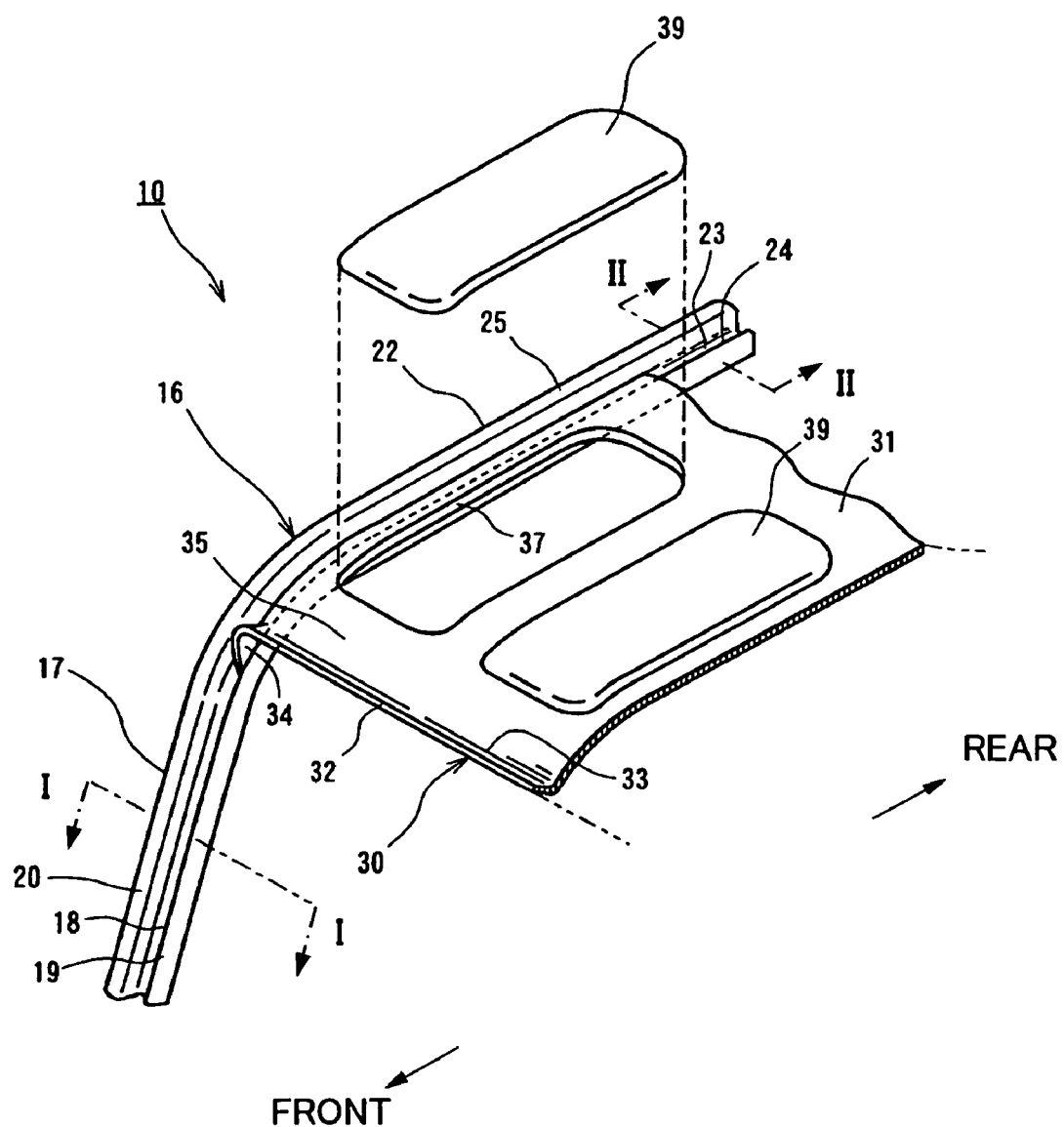
FIG. 2 is a schematically perspective view of the overhead guard according to the first preferred embodiment of the present invention.
Figure 3B:
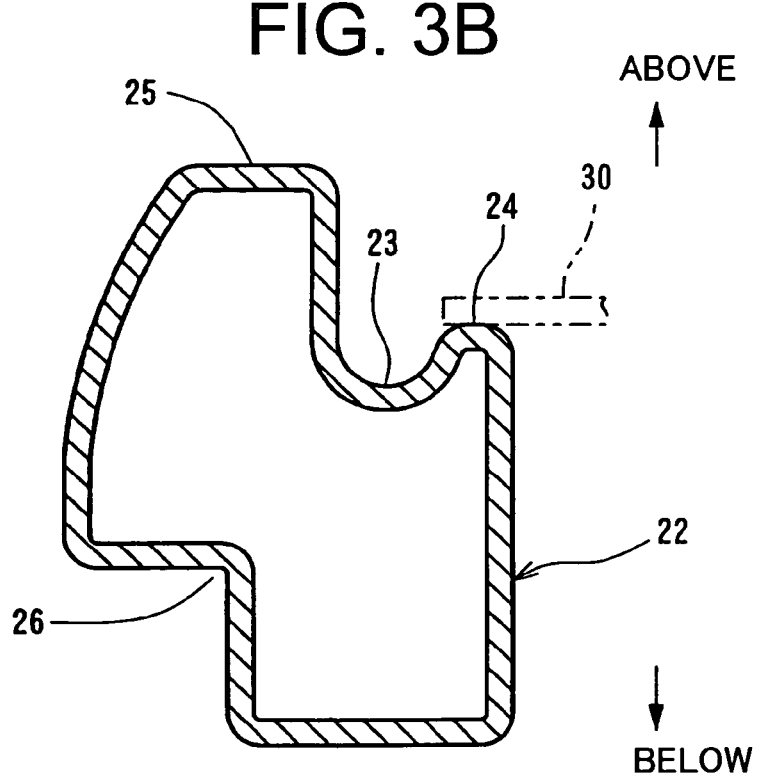
FIG. 3B is a cross-sectional view of the pillar of the overhead guard, taken along the line II-II in FIG. 2.
Figure 5:
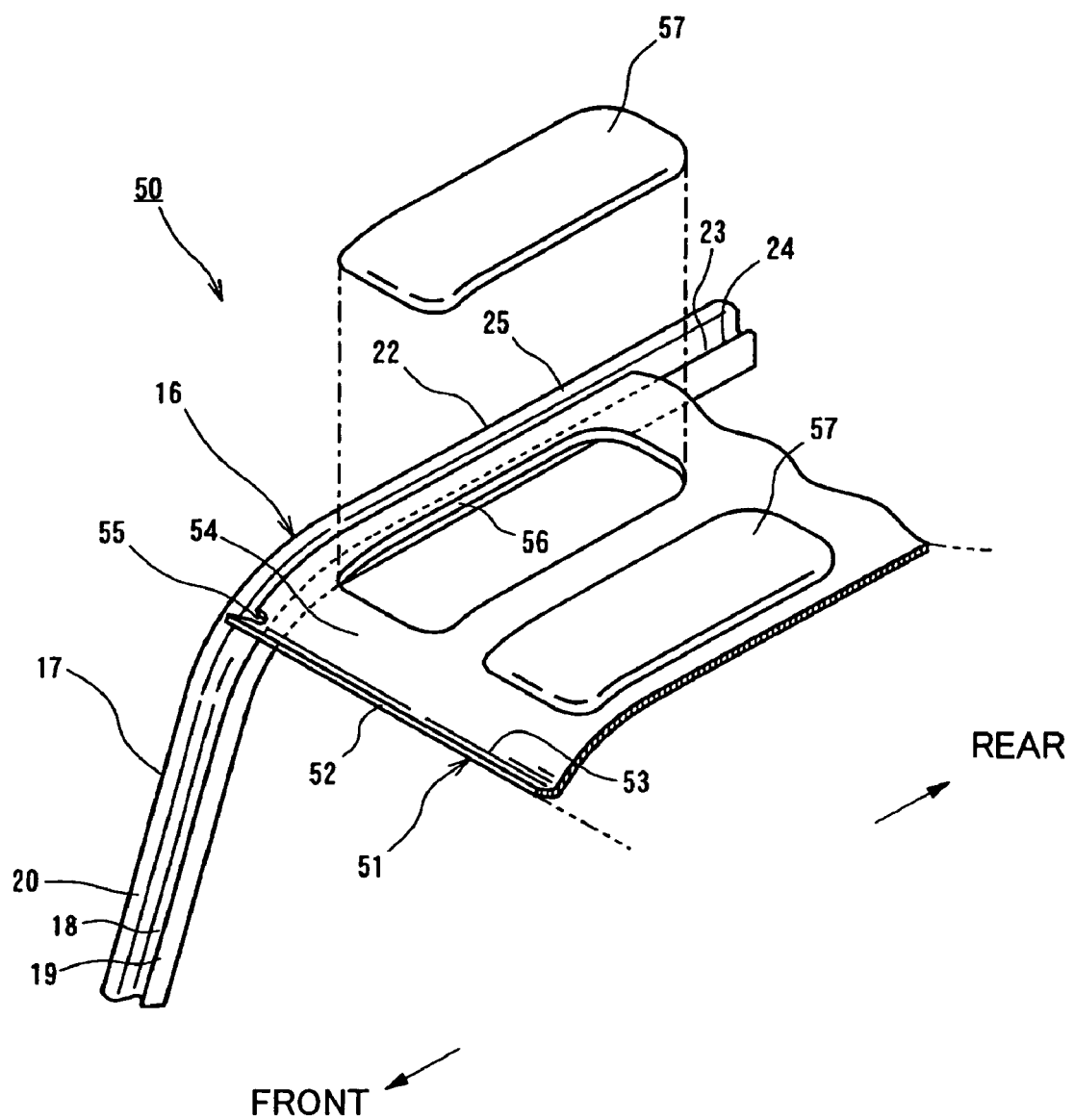
FIG. 5 is a schematically perspective view of an overhead guard according to a second preferred embodiment of the present invention.

The following will describe the top 30 more in detail. The top 30 is a plate-like member, which is supported by the top support 22 of the front pillar 16 and acts as a cover over the operator's seat 11. The top 30 has a substantially rectangular shape as shown in FIG. 1 and the top body 31 is welded to the inner projections 24 at the lateral sides thereof as shown in FIGS. 2 and 3B. The surface of the top body 31 is disposed lower than the outer projection 25 of the top support 22, so that the outer projection 25 functions as a side dam. The groove 23 is inclined upward as seen from the front of the vehicle thereby to allow water on the top 30 to flow thereinto. The top 30 has a dam body 32 that extends along the entire front end of the top body 31 and is bent upward, as shown in FIG. 5. The dam body 32 is made by bending a plate-like member by pressing to such an angle that allows the dam body 32 to function as a barrier against water and to such an extent that most part of the dam body 32 is not visible from the operator's seat 11.

The top body 31 has a substantially V-shaped groove portion 33 which is formed by the dam body 32 bent upward. That is, the top 30 includes the dam body 32 which is located forward of the groove portion 33 and the top body 31 located rearward of the groove portion 33, respectively. The groove portion 33 extends across the top 30 along the dam portion 32 that extends transversely along the front end of the top 30. In this embodiment, the dam body 32 has at the opposite ends thereof bent portions 34 which are bent frontward and fixed along the inner projections 19 of the pillar portions 17. The bent portions 34, which are formed by drawing, functions to drain water guided into the groove portion 33 toward the groove 18 over the inner projections 19.

The top body 31 also includes a slope portion 35 that slopes down toward the dam body 32 from the middle of the top 30 as seen in the longitudinal direction thereof. The slope portion 35 has a gently circular arc shape in longitudinal cross-section, and the slant of the slope portion 35 functions to guide water on the top 30 toward the dam body 32. On the other hand, a rear bar 36 is welded to the rear end of the top body 31 so as to extend transversely along the entire rear end. In this embodiment, the rear bar 36 functions as a dam against water and has attached to the rear surface thereof indicating lamps (not shown) such as tail lamp.

The top body 31 has a plurality of holes formed therethrough as in the case of the prior art. The holes include oblong holes 37 and circular holes 38 and transparent resin caps 39, 40 are fitted to such holes. The resin caps 39 shown in FIG. 2 are so formed as to substantially correspond to the shape of the circular holes 37. The resin caps 39 fitted in the oblong holes 37 offers upward visibility for safety in working.

The following will describe how water on the overhead guard 15 drains off according to the first preferred embodiment. Rainwater falling on the top 30 of the overhead guard 15 guided mainly by the slope portion 35 toward the dam body 32. By damming water by the dam body 32, the water is prevented from flowing over the dam body 32 and then falling onto the operator's seat 11. Therefore, when the forklift truck 10 is stopped by application of brake, water rarely falls onto the operator's seat over the dam body 32. When the forklift truck 10 is at a stop, water on the top 30 flows toward the dam body 32 by the slope portion 35 without being gathered on the top 30.

Furthermore, the dammed water flows along the horizontal groove portion 33 toward the front pillars 16 and then guided by the bent portions 34 of the dam body 32 to drain onto the grooves 18 of the pillar portions 17. When the water drains off from the top 30 toward the front pillars 16, the bent portions 34 does not only guide the water from the groove portion 33 toward the grooves 18, but also prevent the water from falling onto the operator's seat 11 by damming the water. The water that has drained into the grooves 18 of the pillar portions 17 is guided by the grooves 18 and then drains off the forklift truck 10. Water flowing laterally on the top 30 when the forklift truck 10 is turned in either direction is stopped by the outer protrusions 25 of the top support 22 which function as a side dam to dam the water that flows laterally.

Thus, the overhead guard 15 of the above embodiment according to the present invention allows water on the top 30 to drain off irrespective of whether the forklift truck 10 is at a stop or in operation and also enables the reduced number of components thereof and shortened manufacturing time.

According to the overhead guard 15 of the first preferred embodiment, the following advantages are obtained.

(1) Since the dam body 32 is formed by bending a part of the top 30 upward, the top 30 having such dam body 32 is a single component of the overhead guard 15. Thus, the overhead guard 15 has a function to drain water on the top 30 and has a smaller number of components in comparison to a conventional overhead guard that has separate dam member and top.

(2) The top 30 has the slope portion 35 that extends toward the dam body 32, so that water on the top 30 is guided by the slope portion 35 toward the dam body 32 and hardly remains on the top 30.
(3) The slope portion 35 has a function to promote a smooth flow of water on the top 30 toward the dam body 32, so that dust on the top 30 may be removed by such flow of water.
(4) The dam body 32 is bent at such an angle that most of the dam body 32 is invisible from the operator's seat 11. Therefore, the dam body 32 does not hinder vision of the operator. Furthermore, the above-described embodiment of the present invention offers improved visibility over a conventional overhead guard having a dam member attached thereto.
(5) The bent portions 34 provided at the opposite end of the dam body 32 are formed along the inner projections 19 of the pillar portions 17, so that water dammed by the dam body 32 is guided over the inner projections 19 into the grooves 18 of the pillar portions 17, and water on the top 30 tends to drain off immediately through the dam body 32 and the grooves 18 of the pillar portions 17 without remaining on the top 30.
(6) The provision of the bent portions 34 at the opposite ends of the dam body 32 ensures draining of water from the top 30 to the pillar portions 17. Additionally, drawing the bent portions 34 simultaneously with the pressing of the dam body 32 can shorten the time for manufacturing the top 30.

The following will describe a second preferred embodiment of an overhead guard 50 according to the present invention with reference to FIG. 5. In this embodiment, the same reference numerals denote the substantially identical components to those in the first preferred embodiment and the description of such components is omitted for the sake of convenience.

Referring to FIG. 5, the opposite ends of the dam body 52 of the top 51 reach the respective inner sides of the outer projections 19 of the pillar portions 17. That is, the dam body 52 of the second preferred embodiment has no part corresponding to the bent portions 34 of the dam body 32 of the first embodiment. The dam body 52 is formed merely by bending the front part of the top 51 linearly along the entire width thereof and, therefore, the top 51 of this embodiment can be manufactured by easy bending operation by a press. Furthermore, the side edges of the top 51 reach the respective outer projections 25, so that the grooves 23 are covered with the top 51. In this case, a hole or any cut may be formed through the top 51 near the side ends thereof as a passage for communication between the top 51 and the grooves 23.

Figure 6:
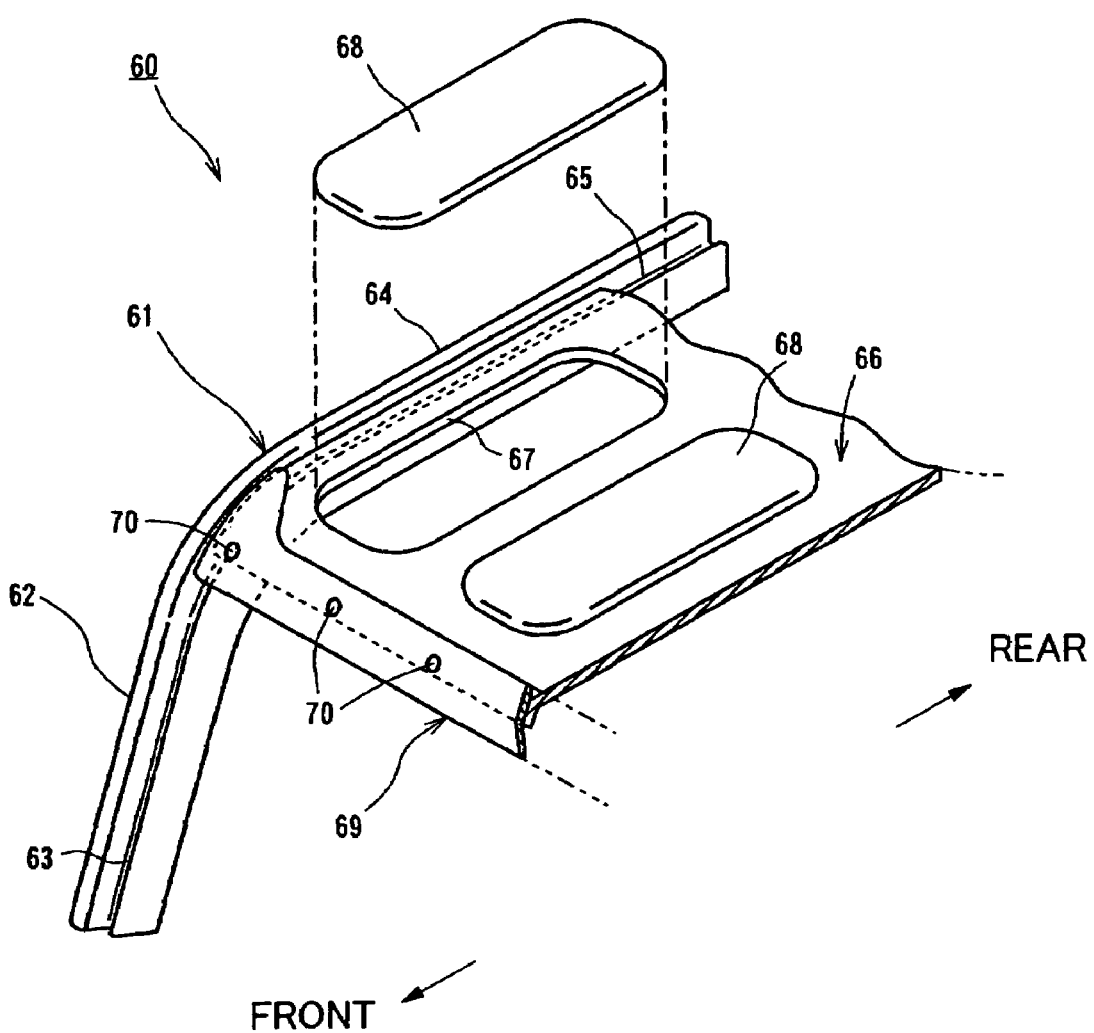
FIG. 6 is a schematically perspective view of an overhead guard according to a prior art.
Figure 7:
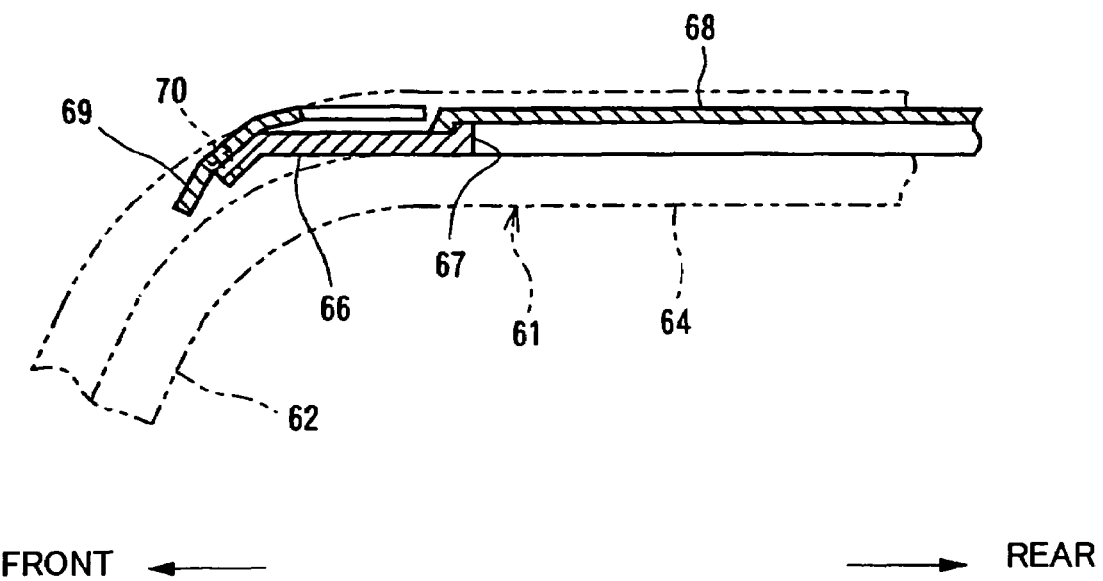
FIG. 7 is a schematically longitudinal perspective view of a top of the overhead guard according to the prior art.

The groove portion 53 is formed in the top 51 by bending the front part of the top 51 upward thereby to form the dam body 52. In addition, the top 51 has the slope portion 54 which corresponds to the slope portion 35 of the board 31 in the first preferred embodiment. Guide passages 55 are formed at the ends of the groove portion 53 on the top 51 for guiding water to flow from the top 51 into the grooves 18 of the pillar portions 17. The guide passages 55 may be formed by cutting or perforation of a plate for the top 51 or by blanking operation by a press. Accordingly, substantially all water on the top 51 flows into the grooves 18 through the guide passages 55 without flowing from the top 51 directly into the grooves 23. As in the first preferred embodiment, the top 51 according to the second preferred embodiment has holes formed therethrough, to which transparent resin caps 57 are fitted. It is noted that FIGS. 5 and 6 show only oblong holes 56.

According to the second preferred embodiment, the same advantages (1) through (4) of the first preferred embodiment are obtained.

In addition to the above advantages, the second preferred embodiment is advantageous in that the side ends of the dam body 52 extend to the outer projections 19 of the respective pillar portions 17 and the guide passages 55 connect the top 51 to the grooves 18, so that water dammed by the dam body 52 is guided through the communication passages 55 and flows over the inner protrusions 19 and then into the grooves 18 of the pillar portions 17. It is noted that the guide passages 55 for connection between the top 51 and the grooves 18 need to be formed, but the side ends of the dam body 52 need not be formed along the inner protrusions 19.

The present invention is not limited to the embodiments described above but may be modified into the following alternative embodiments.

In the first and second preferred embodiments, a material handling vehicle, particularly a forklift truck, has been shown as an example of industrial vehicle. However, the present invention is also applicable to construction vehicles, such as a bulldozer and a power shovel, that are equipped with an overhead guard.

In the first and second preferred embodiment, the dam body is formed at the front end of the top and the right and left front pillars are formed with a groove, respectively. However, the dam body may be formed near the rear end of the top and water on the top may flow through the rear pillars. Alternatively, the grooves formed in the front pillars may be formed in the rear pillars, as well. For example, only either one of the right and left pillars may have the groove. In such a case, the groove portion of the top should be formed with such an inclination along the width of the top that permits the flow of water toward the grooved pillar.

In the first and second preferred embodiment, the slope portion of the top has a substantially circular arc shape in longitudinal cross-section. However, the shape may be changed to a straight as far as the slope is directed toward the dam body with a decline. Alternatively, the entire top except the dam body may be formed to have a downslope for further improved draining of water.

In the second preferred embodiment, the side ends of the dam body are engaged with the outer projections. However, the side ends of the dam body may be located above the grooves. In this case, the guide passages should be formed between the side ends of the dam body and the outer projections, so that water on the top drains off through the guide passages to the grooves. By so doing, the top does not require extra machining.

Therefore, the present examples and embodiments are to be considered as illustrative and not restrictive, and the invention is not to be limited to the details given herein but may be modified within the scope of the appended claims.

What is claimed is:

1. An overhead guard of an industrial vehicle, which facilitates the drainage of water, comprising:
    a top disposed above and covering an operator's seat, wherein the top includes:
        a dam body formed at its front edge and/or rear edge by bending upward a part of the top, for damming water on the top and
        a slope portion that slopes down toward the dam body; and
    a plurality of pillars supporting the top, wherein at least one of the pillars has a groove extending in a longitudinal direction of the pillar so as to be obliquely upward or upright, wherein water on the top is guided by the dam body to drain onto the groove, wherein the pillar having the groove includes an inner projection and an outer projection for defining the groove, and wherein the dam body has at least one bent portion which is bent frontward and fixed along the inner projection of the pillar so as to guide water dammed by the dam body over the inner projection into the groove.

2. The overhead guard according to claim 1, wherein the dam body is bent at such an angle that most of the dam body is invisible from the operator's seat.

3. The overhead guard according to claim 1, wherein a surface of the top is disposed lower than the outer projection.

4. The overhead guard according to claim 1, wherein at least one of the pillars includes a recess formed along the pillar at an outer lower portion of the pillar.

5. The overhead guard according to claim 1, wherein the slope portion has a gently circular arc shape in longitudinal cross-section.

6. The overhead guard according to claim 1, wherein the industrial vehicle is a material handling vehicle.

7. The overhead guard according to claim 6, wherein the industrial vehicle is a forklift truck.

* * * * *